Patented Mar. 19, 1940

2,193,941

UNITED STATES PATENT OFFICE 2,193,941

BONDED ARTICLE

Fritz Seebach, Erkner, near Berlin, Germany, assignor to Bakelite Corporation, New York, N. Y., a corporation of Delaware No Drawing. Application April 20, 1937, Serial No. 137,911. In Germany April 27, 1936

2 Claims. (Cl. 144—309)

It has been a common practice in the plywood industry to employ vegetable or animal glues for cementing together the laminations. Such binders have the objection that they are not resistant to moisture; damp weather causes the cementing layer to swell and this swelling may continue until the plies separate. More recently in place of vegetable or animal glues synthetic resins have been substituted and used in various ways. For example plies of wood have been coated with a synthetic resin solution or a separate sheet impregnated with synthetic resin has been inserted between the plies of wood to thereby bond them together. An objection to a synthetic resin bond is that when applied in a dissolved form it penetrates more or less into the wood; but in the bonding of wood plies it is not the object to secure impregnation of the wood but rather to have the resin function as a bonding agent in the form of an interposed continuous film without departing from this condition either when applied to the laminations to be cemented or when the laminations are bonded under heat and pressure to form plywood.

It has now been found that an excellent cement or bond for plywood is obtainable from condensation products of phenols with aldehydes or equivalent agents that are in the solid stage where they are no longer fusible but only plastic when heated. The cementing action thus obtained is all the more surprising for it could not be surmised that the plasticity obtained by heating a resin that is no longer fusible suffices to bond laminations of wood to form satisfactory plywood.

In practicing the invention the phenol-aldehyde resin can be applied in various ways to the surfaces to be bonded. The laminations of wood can be dusted with the resin in powder form or the resin can be applied in the form of a fine dispersion or suspension by means of a brush, spray gun or the like. For preparing the dispersion, water or other liquid in which the synthetic resin is not soluble can be used.

The phenol-aldehyde resins found most suitable are those that harden with rapidity or those that do not in a hot-press molding operation release in objectionable quantities volatile products such as phenol or water; it is preferable to take a resin of the novolak or fusible type, i. e., a resin that at the utmost is but slowly heat-reactive, and after removing the volatiles through washing and dehydration fusing the resin with a hardening agent such as hexamethylenetetramine. Resins prepared from a phenol and formaldehyde or from a phenol, wood oil and formaldehyde are particularly desirable. Other ingredients can be included in suitable amounts, as dyes or for example 5 per cent of wood flour which is advantageous in forming and stabilizing dispersions or suspensions; asbestos can be substituted for securing improved fire resistance.

As an illustration a phenol-aldehyde resin of the fusible type is treated with a hardening agent and an alkaline catalyst to convert it to a typically heat reactive type; for example, it is heated with hexamethylenetetramine in a kneader or other suitable mechanical mixing device. The heating is continued until it is transformed into a state where it is infusible when heated but is still sufficiently plastic to have the requisite flow under the usual pressure and temperature conditions required in veneering operations.

The fusible or slowly heat-reactive type of resin used in the practice of this invention, is preferably obtained by condensing phenol and formaldehyde in approximately equimolecular proportions in the presence of acid catalyst until a separation into a resinous and an aqueous layer occurs, and continuing the heating for some time thereafter to raise its melting point. The resin is separated, washed and dehydrated, preferably in vacuo. As an example, about equimolecular proportions of phenol and 37% aqueous formaldehyde solution and about 0.5% of 3N hydrochloric acid based on the weight of phenol, are refluxed in a kettle for 35 minutes or for about 20 minutes after the separation into a resinous and aqueous layer has occurred. The resin is separated and washed with water and then dehydrated by heating under a partial vacuum to about 140° C., giving a resin having a melting point ranging from 70–85° C.

50 kg. of a novolak prepared as above described, and 10 kg. hexamethylenetetramine are melted in a heated kneader—preferably with addition of about 20–30 kg. of water. After thorough incorporation by the hexamethylenetetramine, the mass is removed from the kneader and heated in an oven until it no longer fuses but is still sufficiently plastic when warm so that is flows under pressure.

The resin so prepared is ground to about 100–200 mesh; in this form it can be dusted to form a coating on one face of the veneer ply (about 55–60 sq. ft. of veneer being covered with about 1 lb. of resin). It can be applied also in the form of a suspension or dispersion in water, benzol or other non-solvent by first mixing the resin to a thin paste with about double the quantity of the non-solvent; it is then sprayed or brushed onto one surface of the ply, about the same amount of resin figured on the dry weight being applied as when the resin is used in the dry way. The ply is then allowed to dry, either at room or slightly elevated temperature, say about 80° C., until quite dry to the touch but with the bond still sufficiently adherent so that it remains on the panel during the handling incident to putting it in the press. A series of coated plies is then assembled, although it is feasible to build up an assembly consisting of alternate coated (where both sides are coated) and uncoated plies. After assembly, the panel is pressed in the usual veneer press at about 150-170° C. for about 3-8 minutes at 300 lbs. per sq. in pressure.

Standard panels of 3 plies of 1/16" birch veneer, bonded as above described, i. e., by a resin as dry powder or in water suspension, were tested by pulling apart test specimens with 1" shear area on a standard Riehle plywood testing machine. Both dry and wet strengths (i. e., after immersion of the test specimens for 1 hour in boiling water) were obtained of over 300 lbs. to the square inch.

Plywood made in accordance with the present invention exhibits great resistance to cold and hot water. By means of a magnifying glass it can be seen that the film of synthetic resin bond is continuous or has not penetrated into the wood laminations to an extent to destroy the continuity of the film.

I claim:

1. In a process of preparing bonded articles by assembling a ply with a base and an interposed binder layer and subjecting the assembly to heat and pressure, the improvement which comprises providing a binder of a heat-reactive phenol-aldehyde resin brought by controlled heating to a state of transformation characterized by being infusible but possessing the property of becoming plastic and then hardening under the action of heat and pressure, applying to the ply a layer of said binder while it is in said state of infusibility but capable of becoming plastic and then hardening on heating, and heating the assembly while applying pressure sufficiently to convert the heat-reactive resin to the final hard, infusible, insoluble state whereby a substantially continuous bonding film is obtained.

2. In a process of preparing bonded articles by assembling a ply with a base and an interposed binder layer and subjecting the assembly to heat and pressure, the improvement which comprises providing a binder of a phenol-aldehyde novolak resin made heat-reactive by fusion with a hardening agent and brought by controlled heating to a state of transformation characterized by being infusible but possessing the property of becoming plastic and then hardening under the action of heat and pressure, applying to the ply a layer of said binder while it is in said state of infusibility but capable of becoming plastic and then hardening on heating, and heating the assembly while applying pressure sufficiently to convert the heat-reactive resin to the final hard, infusible, insoluble state whereby a substantially continuous bonding film is obtained.

FRITZ SEEBACH.